United States Patent [19]
Deutsch

[11] Patent Number: 4,625,281
[45] Date of Patent: Nov. 25, 1986

[54] ENGINE LOAD TRANSIENT COMPENSATION SYSTEM

[75] Inventor: Robert W. Deutsch, Sugar Grove, Ill.
[73] Assignee: Motorola, Inc., Schaumburg, Ill.

[21] Appl. No.: 641,117
[22] Filed: Aug. 15, 1984
[51] Int. Cl.[4] ........................ F02M 23/06; G06F 7/76
[52] U.S. Cl. ........................ 364/431.03; 364/431.07; 123/339
[58] Field of Search ........................ 364/431.03, 431.04, 364/431.05, 431.07; 123/339, 480, 492

[56] References Cited

U.S. PATENT DOCUMENTS

| | | | |
|---|---|---|---|
| 4,237,838 | 12/1980 | Kinugawa et al. . | |
| 4,240,145 | 12/1980 | Yano et al. . | |
| 4,305,360 | 12/1981 | Meyer et al. . | |
| 4,321,900 | 3/1982 | Takeda | 123/339 |
| 4,344,398 | 8/1982 | Ikeura . | |
| 4,467,761 | 8/1984 | Hasegawa | 123/339 |
| 4,479,471 | 10/1984 | Hasegawa et al. | 123/339 |
| 4,479,472 | 10/1984 | Shimamura | 123/339 |
| 4,540,060 | 9/1985 | Kawata et al. | 364/431.07 |

*Primary Examiner*—Parshotam S. Lall
*Attorney, Agent, or Firm*—Phillip H. Melamed

[57] ABSTRACT

An engine load transient compensation system is disclosed for compensating a vehicle engine in accordance with various engine loads selectively implemented in response to actuation of accessory switches. The accessory switches which selectively implement additional engine loads are series coupled through associated resistors to a summing terminal wherein digital switch control signals provided by the switches result in a composite analog signal at the summing terminal whose magnitude is related to the amount of accessory engine load. The summing terminal is provided as an input to a microprocessor which effectively determines whenever a substantial change in engine accessory load is to be implemented in accordance with the accessory switches, and compensation for this engine load transient is provided by the microprocessor in accordance with the magnitude of the change in engine accessory load. The circuitry which provides the composite analog signal related to accessory load is external to the microprocessor thus resulting in providing the microprocessor with only one accessory load input signal and simplifying the operation of the microprocessor.

28 Claims, 4 Drawing Figures

10
SPEED SENSOR
12
THROTTLE SENSOR
13
MANIFOLD PRESSURE SENSOR
14
11
SPARK
15
DWELL
16
17
18
AIR BYPASS
19
FUEL CONTROL
20
MICROPROCESSOR
AIR CONDITIONER
25
ELECTRIC FAN
26
REAR WINDOW DEFOGGER
27
ACCESSORY
28
30
31
32
33
34
35
B+
21
22
23
24
a
b

ENGINE LOAD TRANSIENT COMPENSATION SYSTEM

CROSS REFERENCE TO RELATED APPLICATIONS

The present invention is related to the invention described in copending U.S. patent application Ser. No. 630,480, filed July 13, 1984, entitled, "Engine Control System Including Engine Idle Speed Control", by Robert W. Deutsch, having the same assignee as the present invention, now abandoned.

BACKGROUND OF THE INVENTION

The present invention is generally related to the field of providing compensation control for a controlled apparatus which provides an output supplied to various associated output loads. More specifically, the present invention is related to predicting an expected output load change which is implemented in response to the closure of an electrical switch and altering a control input to the apparatus to provide compensation for the expected change (transient) in the output load condition. A particular application of the present invention relates to providing such load transient compensation for a vehicle internal combustion engine by sensing when various output loads are provided to the engine in accordance with the selective closure of various electrical switches.

Engine control systems for a vehicle are known in which, in an idle speed control mode, the extent of an expected change in engine load is predicted and the fuel mixture input to the engine is controlled in accordance with the expected engine load change so as to compensate for the load transient. This technique of predicting the occurrence of an engine load transient and providing compensation control to the engine in response to this prediction, rather than after and in response to the actual occurrence of a load transient, permits more accurate control of the engine. This is because the operating of the engine can be adjusted almost immediately at the start of a load transient rather than some time after the beginning of the load transient. Thus when an engine control system is, for example, implementing an idle speed control mode, prior systems have recognized that turning on vehicle accessories such as an air conditioner will provide a substantial additional engine load. Therefore in order to maintain the engine operating at a desired idle speed it is necessary to rapidly predict the occurrence and extent (magnitude) of this additional engine load and provide additional fuel and air to the engine substantially at the actual start of the air conditioner load transient. This will prevent an initial decrease in engine speed caused by the extra engine load provided by turning on the air conditioner.

In prior engine control systems such as those discussed above, typically the prediction of the occurrence and magnitude of a load transient is accomplished by directly coupling a plurality of various vehicle accessory turn on electrical switches as separate inputs to an engine control microprocessor. The microprocessor interrogates the operative state of each of these switches periodically or aperiodically and responds to the closure of these switches by altering the fuel mixture provided to the engine so as to provide for engine load transient compensation. Typically this is accomplished in an idle speed control mode for the engine control system since in that mode it is necessary to maintain the engine at a constant idle speed despite the occurrence of any selective addition or subtraction of various engine loads. If uncompensated for, these load changes could abruptly alter the engine idle speed. This altered idle speed would exist until the engine control system sensed the decrease or increase in idle speed or engine load provided in response to the engine load transient and then implemented a corrective adjustment of the engine fuel mixture or some other engine control parameter. Typically the adjustment of the engine fuel mixture is accomplished by either adjusting the amount of fuel being delivered to the engine and/or adjusting the amount of air being provided to the engine by an air bypass valve. Copending U.S. patent application No. 630,480 filed July 13, 1984 now abandoned and referred to above discloses an engine idle speed control system which implements idle speed control by controlling the engine fuel mixture in this manner.

In the prior engine control systems which predict engine load transients by having a microprocessor effectively interrogate the operative state of a number of accessory electrical switches directly connected as inputs to the microprocessor, relatively complex programming of the microprocessor is required to provide the desired end result. This occurs because the switch signals coupled as inputs to the microprocessor are two state digital signals and the microprocessor must then weight these digital signals in accordance with the magnitude of the engine load controlled by each switch, sum the weighted digital signals to determine the amount of load being provided in accordance with the closure of these switches, determine if a change (transient) in engine load has occurred which is of sufficient magnitude to justify implementing engine load compensation and calculate and implement the desired amount of engine load transient compensation. While such systems are certainly feasible, a key feature of such engine control systems is that they must rapidly respond to the closure of the switches so as to rapidly predict an expected change in engine load. By requiring extensive microprocessor analysis of the digital switch signals received from the switches, this reduces the response time of the engine control system and makes the system less able to rapidly respond to changes in engine load. This also requires utilization of a substantial amount of computer memory for storing the program which accomplishes the analysis of the digital switch signals. In addition, these prior systems require a number of direct digital signal inputs to the microprocessor thus increasing the number of input signal ports required for the microprocessor and thereby either increasing the cost of the microprocessor or eliminating the use of these input ports for receiving other sensor type information which may be needed.

SUMMARY OF THE INVENTION

An object of the present invention is to provide an improved load transient compensation system which overcomes the above mentioned deficiencies of prior load transient compensation systems.

In one embodiment of the present invention a load transient compensation system is provided comprising: a plurality of switch means each of which, in response to actuation thereof, provides an associated digital switch signal which in turn implements providing an associated output load to an apparatus controlled in accordance with at least one received control input;

circuitry means coupled to said plurality of switch means for receiving said digital switch signals and developing, in response thereto, a composite signal having a signal characteristic related to the amount of load to be provided in accordance with said digital switch signals; transient detection means separate from and coupled to said circuitry means for determining a predetermined change in said signal characteristic over a time interval and providing, in response thereto, a control signal; control means coupled to said transient detection means for receiving said control signal and implementing control of said apparatus in response to said control signal, wherein said circuitry means receives said digital switch signals and provides in response thereto an analog signal as said composite signal with the magnitude of said analog signal corresponding to said signal characteristic and being related to the amount of load provided in accordance with actuation of said switch means. A preferred embodiment of the present invention relates to utilization of such a load transient compensation system to control the fuel mixture provided to an engine which provides the driving output force for the output loads associated with actuation of the plurality of switch means.

Essentially, the present invention involves utilizing the digital switch signals to provide a composite weighted analog signal which is provided as an input to a microprocessor . This analog signal is representative of the engine output load implemented in accordance with selective actuation of the switch means and results in providing just a single control input to the microprocessor rather than a plurality of digital signal inputs thus reducing the number of required input signal connections provided to the microprocessor. In addition, providing a weighted analog control signal input is accomplished through the utilization of a minimum amount of circuitry external to the microprocessor while eliminating the need for the microprocessor to perform the complex and time consuming program steps of interrogating the operative state of each of the switch means, and providing a composite weighted signal related to the magnitude of the load controlled by all of the switch means.

Preferably, the composite analog signal provided by the present invention is implemented by coupling each of the digital switch signals through an associated resistor to a summing terminal wherein the ratio of the magnitudes of these resistors to one another is approximately inversely proportional to the ratio of the magnitudes of the loads controlled by the associated switch means, respectively. Preferably, the microprocessor determines when an engine load transient condition will occur by implementing a transient detection function by sampling the magnitude of the composite analog signal and determining when this signal magnitude exceeds a predetermined magnitude change over an interval of time. In response to the determination that an engine load transient has occurred, the microprocessor produces a control signal which varies in accordance with the change of the magnitude of the composite analog signal and adjusts the amount of fuel being delivered to the engine and/or the amount of air being delivered to the engine so as to control the engine fuel mixture.

While clearly the present invention is applicable to the use of an engine load transient compensation system for controlling engine operation during an engine idle speed mode, the basic principles of the present invention are applicable to implementing load transient compensation for an engine under any operative mode rather than just an idle speed control mode. Also these principles are applicable to implementing load transient compensation for any apparatus in which it is desired to predict a change in output load which will be implemented in response to switch closure and provide an apparatus control change in response to this predicted load change rather than sensing the load change after it occurs and then implementing corrective compensation.

BRIEF DESCRIPTION OF THE DRAWINGS

For a more complete understanding of the present invention, reference should be made to the drawings in which.

DESCRIPTION OF THE PREFERRED EMBODIMENTS OF THE INVENTION

Figure 1:
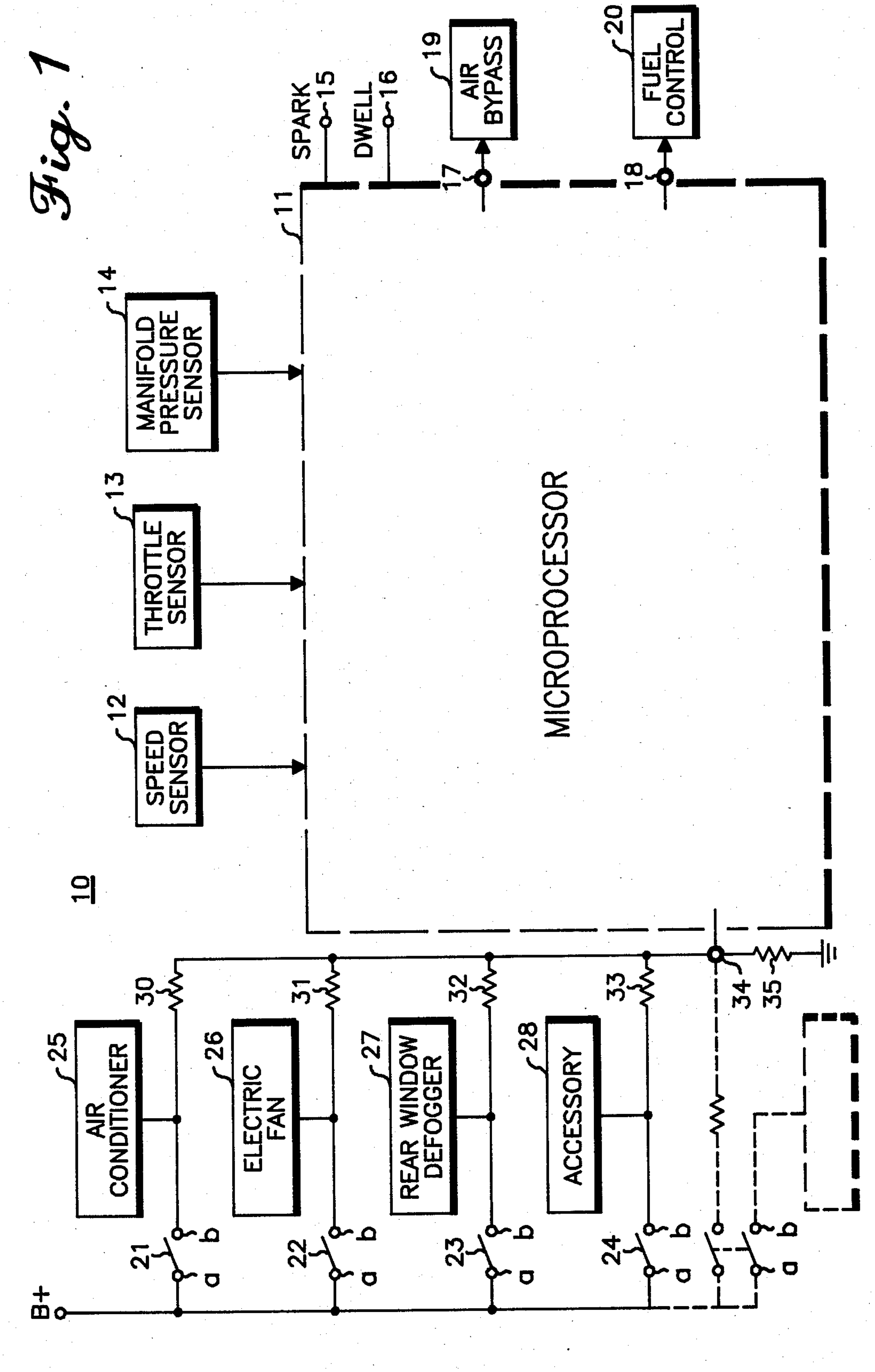
FIG. 1 comprises a block and schematic diagram of an engine control system, including a microprocessor, which incorporates the present invention.

Referring to FIG. 1, an engine control system 10 is illustrated for a vehicle engine (not shown). Essentially, the engine control system 10 includes a microprocessor 11 which receives various sensor inputs and provides engine control output signals. As shown in FIG. 1, some of the sensor inputs provided to the microprocessor 11 comprise an engine rotational speed signal from a speed sensor 12, an engine throttle position signal from a throttle position sensor 13 and an engine manifold pressure signal from an engine manifold absolute pressure sensor 14. In response to these input sensor signals, and possibly many others, the microprocessor 11 will implement engine control by calculating the desired amount of fuel mixture to be provided to the engine, as well as typically also calculating and providing output signals at terminals 15 and 16 (or a composite signal at one terminal) for controlling engine spark timing and engine dwell. Many microprocessor engine control systems such as those discussed above are known and most details of such systems are not substantially related to the present invention and therefore will not be discussed.

It should be noted that typically the microprocessor 11 will provide an air bypass control signal at an output terminal 17 and a fuel control signal at an output terminal 18 which are coupled, respectively, to an air bypass valve 19 and a fuel control apparatus 20. The net result is that the micrprocessor 11, in response to input signals from the sensors 12 through 14, will provide electrical spark and dwell control signals for the engine as well as controlling the engine fuel mixture. Such general operation is well known and many such microprocessor engine control systems are currently available and are described in detail in existing literature. When the engine control system 10 implements idle speed control typically signals are provided at the terminals 17 and 18 to maintain the engine at a predetermined desired idle speed. This is accomplished by utilizing the signal at the terminal 17 to determine the amount ot air provided by the air bypass valve 19 to the engine fuel mixture, while the signal at the terminal 18 determines the amount of fuel provided by the fuel control 20, which may comprise fuel injection apparatus, to the fuel mixture.

As stated previously, typically in an idle speed control mode it is desired that an engine control system effectively predict a change in engine load as soon as possible and then rapidly implement a change in engine control. If the engine control system just relies upon the control inputs from the sensors 12 through 14, this may result in a substantial delay in implementing engine control with the end result being substantial deviations from the desired engine speed. Thus prior engine control systems directly coupled digital signals provided by electrical accessory switches to the microprocessor 11 as inputs and then programmed the microprocessor to interrogate each these digital signals, to provide weighting for these signals in accordance with their associated engine loads and to determine when a substantial engine load transient occurred as well as determining the magnitude of this engine load transient. This required substantial additional programming of the microprocessor 11 and the execution of these programming steps would delay implementation of engine transient control. Additional memory was required for these program steps which could be used for implementing other functions. Also a large number of signal inputs to the microprocessor were required. These deficiencies have been overcome by the present invention in the following manner.

The engine control system 10 in FIG. 1 includes a plurality of accessory two position switches 21, 22, 23 and 24. A terminal a of each of the switches is directly connected to a power supply terminal B+ while a terminal b of each of the switches is directly connected as a control input to various associated vehicle accessories such as an air conditioner 25, an electric fan 26, a rear window defogger 27 and any other type of desired accessory as indicated by the accessory block 28. Each of the b terminals of each of the switches 21 through 24 is series coupled through an associated resistor 30 through 33, respectively, to a summing terminal 34 which is connected to ground through a resistor 35 and is connected as an input to the microprocessor 11. In response to actuation of any one of the switches 21 through 24, a positive digital switch signal is provided at the associated b terminal of the switch which results in the associated apparatus 25 through 28 providing an associated load to the engine. The magnitudes of the resistors 30–33 and 35 are such that closure of any combination of the switches 21–24 will not provide a high enough signal at the b terminal of any non-closed switch to activate the load associated with the non-closed switch. Typically all of the accessories 25–28 are low impedance devices and each of the resistors will be at least one to ten thousand ohms so that no accidental actuation of accessories will occur. Of course if complete isolation is desired double pole, single throw switches can be utilized with one b terminal contact connected to the accessory and another resistively coupled to terminal 34. This is shown in phantom in FIG. 1.

Figure 4:
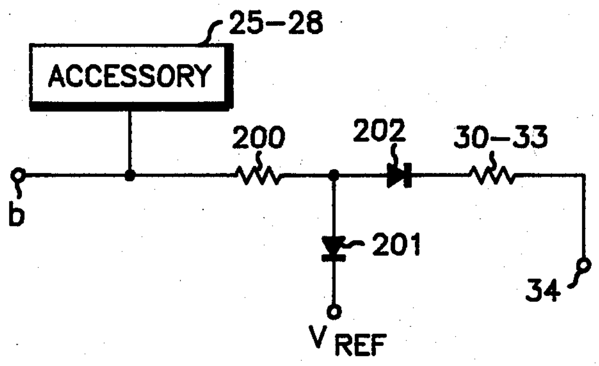
FIG. 4 is a schematic diagram showing a preferred configuration for coupling switches in FIG. 1 to a summing terminal.

Preferably coupling circuits corresponding to the circuit shown in FIG. 4 are connected between each one of the b terminals and each one of the coupling resistors 30–33. The terminal b in FIG. 4 is coupled through a resistor 200 to the anodes of diodes 201 and 202. The cathode of diode 201 is coupled to a fixed voltage reference terminal $V_{ref}$ and the cathode of diode 202 is connected to one of the resistors 30–33. This configuration prevents accidental turning on of accessories by the polarity of diode 202. Also this configuration prevents accessory voltage spikes from reaching terminal 34 and makes the circuit immune to variations in B+ since in response to switch actuation the fixed $V_{ref}$ voltage will be provided at the end of the resistors 30–34 which is not connected to terminal 34.

The ratio of the magnitudes of the resistors 30 through 33 to one another is approximately inversely proportional to the ratio of the magnitudes of the engine loads implemented by the apparatus 25 through 28 associated with the resistors. Thus in response to actuation of any of the switches 21 through 24, the corresponding digital signal at the b terminal of the switch will not only implement an additional engine load by effectively turning on one of the apparatus 25 through 28, but will also provide a composite analog signal at the summing terminal 34 wherein the magnitude of this analog signal is related to the amount of engine load implemented by the apparatus 25 through 28. In essence, the structure represented by the components 21 through 35 results in providing a composite analog signal at the terminal 34 whose magnitude is representative of the engine load to be provided by the apparatus 25 through 28. The microprocessor 11 receives this composite analog signal as an input and effectively determines if an engine load transient has occurred by analyzing the magnitude of this single engine load input signal. This is contrasted with the prior engine control systems which received a number of digital switch input signals and then required the microprocessor to separately interrogate each of these signals, to effectively weight the importance of each of these signals and then to determine if an engine load transient condition existed. Thus the present invention has greatly simplified the operation of the microprocessor 11 with the addition of only a minimal amount of circuitry external to the microprocessor comprising the resistors 30 to 33 and 35, and preferably including coupling circuits such as the circuit shown in FIG. 4.

Figure 2:
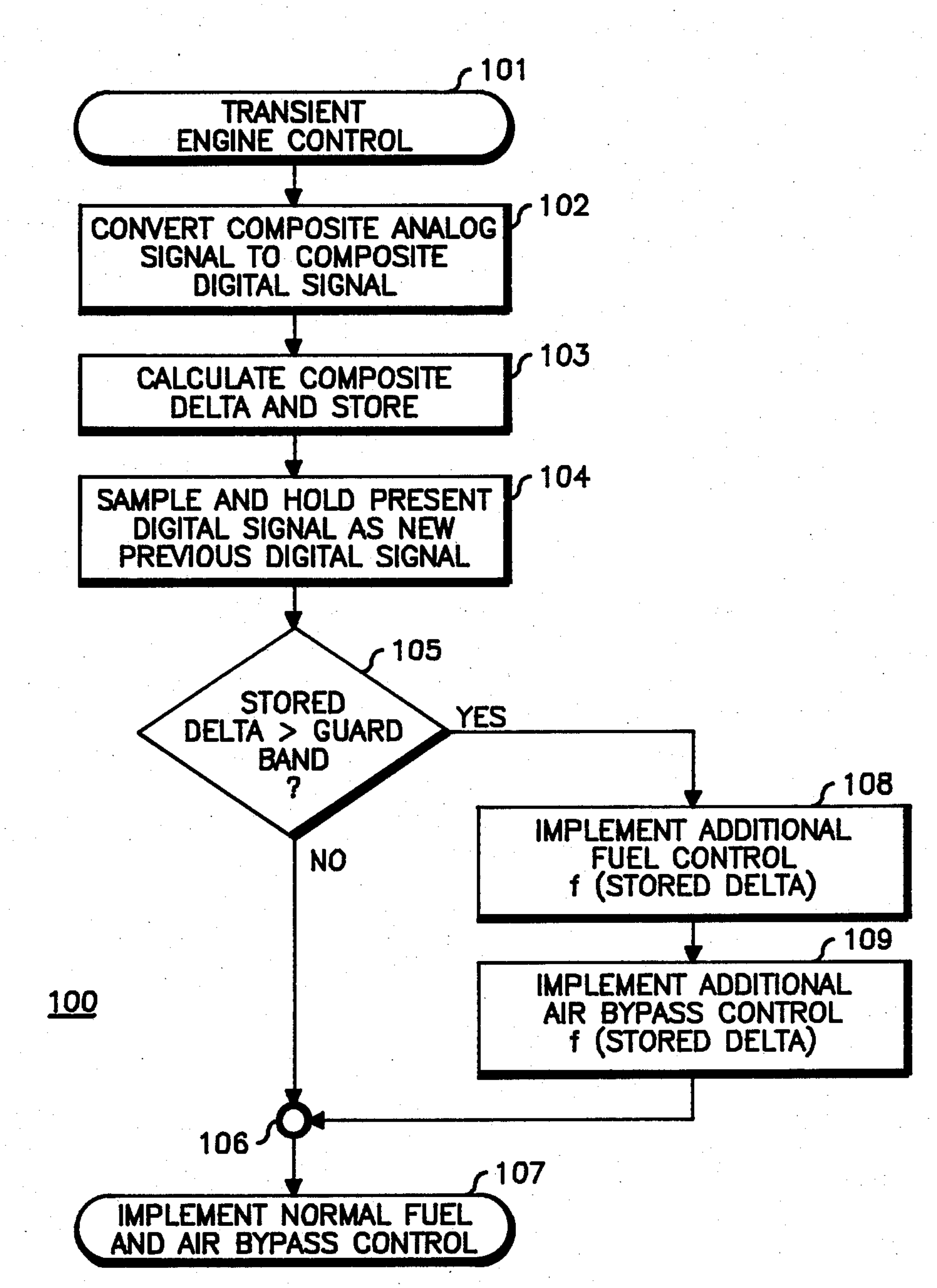
FIG. 2 comprises a flowchart illustrating the load transient engine control operation of the engine control system shown in FIG. 1.
Figure 3:
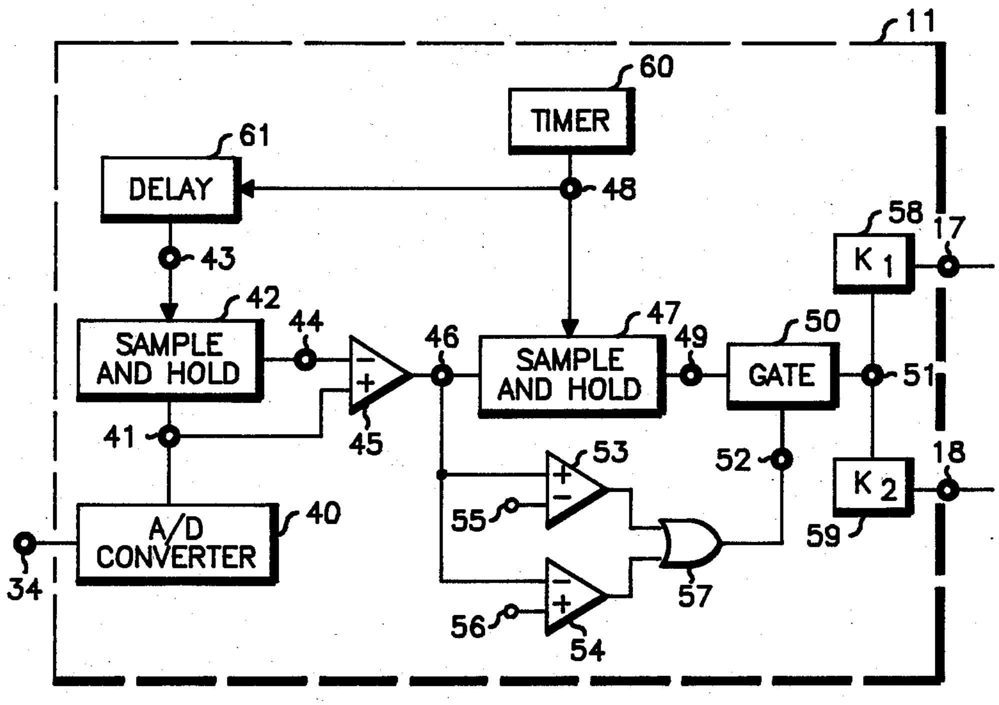
FIG. 3 is schematic diagram illustrating an equivalent hardware embodiment for implementing a load compensation function provided by the microprocessor shown in FIG. 1.

In FIG. 1 the microprocessor 11 is illustrated in block form, but in FIG. 3 an equivalent hardware embodiment for the microprocessor is illustrated as comprising a number of individual circuit elements which implement a load transient compensation function. Preferably the microprocessor comprises a computer which accomplishes its desired end results by implementing computations in accordance with preprogrammed instructions and in response to received input signals. However, the structure in FIG. 3 represents a hardware equivalent of the operation of the microprocessor 11 which relates to the processing of the analog composite signal related to engine load provided at the terminal 34. It should also be noted that a flowchart in FIG. 2 represents, in general terms, both the operation of the microprocessor 11 and the operation of the hardware embodiment shown in FIG. 3 with respect to the processing of the analog signal at the terminal 34. If desired, the microprocessor 11 could be replaced by an entire hardware embodiment. However, even in that case it should be noted that the structure of the hardware embodiment would be simplified due to the utilization of the present invention which provides a composite analog signal at the terminal 34 related to the engine load implemented in accordance with actuation of the switches 21 through 24.

Referring to FIG. 2, a general load transient compensation flowchart 100 of the microprocessor 11 is illustrated wherein the flowchart just illustrates how the microprocessor responds to the composite analog signal at the terminal 34. The flowchart 100 is entered at an initializing block 101 which implements a transient engine control routine as opposed to a steady state microprocessor engine control routine which is responsive to the sensor input signals from the sensors 12 through 14. From 101 control passes to a process block 102 which converts the composite analog signal at the terminal 34 into a composite digital signal since the microprocessor 11 utilizes digital signals in its computations. Then control passes to a process block 103 wherein the microprocessor will determine the amount of change in the signal at the terminal 34 by comparing, over a sample time interval, the previous and present values of the composite digital signal derived from the analog signal at the terminal 34. This difference is referred to as the composite delta, and the process block 103 will store this difference information. Then control passes to a process block 104 which results in storing the present digital composite signal for future use as a previous digital composite signal in calculating the composite delta during the next execution of the flowchart 100. Typically the sample time interval is the time between executions of the flowchart 100.

From process block 104 control passes to a decision block 105 which compares the composite stored delta with a guard band to determine if a substantial difference in engine load has occurred over the sample time interval. Preferably this is best accomplished by converting the stored delta into an absolute value and comparing it with a fixed threshold. If the decision block 105 determines that no substantial change in engine load has occurred over the sample time interval, then control passes to a summing terminal 106. Then the flowchart 100 is exited by implementing a subsequent flowchart routine 107 during which the microprocessor 11 implements the normal fuel mixture control of fuel and air in response to the signals provided by the sensors 12 through 14.

If the decision block 105 determines that a substantial change in engine load will occur in response to a change in the composite analog signal, representing either a substantial increase or decrease in engine load, then control passes from the decision block 105 to a process block 108 which implements additional fuel control as a function of the magnitude of the stored delta signal wherein now the polarity of the stored delta signal is taken into account. From process block 108 control passes to process block 109 which implements a similar additional control function for the air bypass valve 19 as a function of the stored delta. Control then passes back to the summing terminal 106 and then on to the normal control routine 107. Preferably the process blocks 108 and 109 function by providing control signals to the air bypass valve 19 and fuel control apparatus 20 wherein the degree of change in the effective magnitude of these control signals is proportional to the degree of change in the magnitude of the composite analog signal at the terminal 34.

It should be noted that the microprocessor 11 will control how often the flowchart 100 is entered. Therefore the microprocessor effectively controls the sample time interval between executions of the process block 103 comparing the previous and present composite digital signals. This represents no problem since it is contemplated that the flowchart 100 will be repetitively executed by the microprocessor 11 either on a periodic or aperiodic basis wherein during each execution of the flowchart 100 the present digital signal will be compared with the composite digital signal that was previously stored by the process block 104.

As previously noted, FIG. 3 essentially illustrates an equivalent hardware embodiment for the microprocessor 11 which effectively accomplishes the same end results as the flowchart 100. The structure and operation of this equivalent hardware embodiment will now be discussed.

In FIG. 3, the composite analog signal at the terminal 34 is directly coupled as an input to an analog to digital converter 40 which provides a corresponding digital composite signal at an output terminal 41. The terminal 41 is connected as an input to a sample and hold circuit 42 which, in response to a control signal at a control input terminal 43, will sample the signal at the terminal 41 and store this signal so that it is provided as a held signal at an output terminal 44. The terminals 41 and 44 are coupled as inputs to a difference comparator 45 which provides at an output terminal 46 a signal proportional to the difference between the signals at the terminals 41 and 44.

The terminal 46 is provided as an input to another sample and hold circuit 47 which has a control input terminal 48 and provides, in response to a sample signal being present at the terminal 48, a held output signal at the terminal 49 related to the signal at the terminal 46. The terminal 49 is connected as an input to a gate 50 which provides a direct connection to a terminal 51 when the gate is closed and an open circuit when the gate is open. The opening and closing of the gate 50 is controlled by signals at a control terminal 52. The terminal 49 is also connected as an input to the positive and negative input terminals of digital comparators 53 and 54, respectively, which have their other input terminals connected to reference potential terminals 55 and 56, respectively. The outputs of the digital comparators 53 and 54 are each connected as inputs to an OR gate 57 whose output is directly connected to the terminal 52. The terminal 51 is directly connected as an input to a first transfer function block 58 which has its output directly connected to the terminal 17 and a second transfer function block 59 which has its output directly connected to the terminal 18.

Essentially the transfer function blocks 58 and 59 respond to the signal at the terminal 51 by providing corresponding control signals at the terminals 17 and 18 which are functions of the signal at the terminal 51. Preferably the resultant signals at the terminals 17 and 18 vary in proportion to the signal at the terminal 51. Thus the transfer function blocks 58 and 59 merely represent circuits which receive an input signal and produce a corresponding output signal in accordance with a desired predetermined relationship wherein this exact relationship would have to be determined separately for each type of engine control system and the engine associated therewith.

A timer 60 is illustrated in FIG. 1 as providing a sample time interval output signal to the terminal 48 to control the sample and hold interval for the circuit 47. In addition, the terminal 48 is connected as an input to the terminal 43 through effective delay circuit 61 which insures that the sample and holding circuit 47 implements its sample and hold function prior to the implementation of the sample and hold circuit 42.

The operation of the components 40 through 61 shown in FIG. 3 will now be discussed.

Essentially the analog to digital converter 40 transforms the analog composite signal at the terminal 34 into a digital composite signal at terminal 41. The sample and hold circuit 42 and the difference comparator 45 effectively compare the previous and present composite digital signals and provide a delta cor:posite digital signal at the terminal 46. The sample and hold circuit 47 is utilized just to insure that subsequent changes of the digital composite signal at the terminal 41 which occur between the sample time intervals set up by the timer 60 will not affect engine control. Thus it is contemplated that the timer 60 will result in first actuating the sample and hold circuit 47 to provide at the terminal 49 the composite delta signal. Then the signal at the terminal 48 provided by the timer 60 will, by virtue of the delay circuit 61, result in actuating the sample and hold circuit 42 to replace the previously held digital composite signal at the terminal 44 with a new held digital composite signal to be utilized in the next comparison of previous and present digital composite signals. The timer 60 could comprise merely an oscillator which determines a predetermined sample time interval between digital output pulses provided to the terminal 48.

The signal at the terminal 49 will be prevented from reaching the control terminal 51 unless the control signal at the terminal 52 closes the gate 50. This will occur whenever the magnitude of the composite digital delta signal at the terminal 49 is outside of the guard band represented by positive and negative reference voltages maintained at the terminals 55 and 56, respectively. This is because in this event one of the digital comparators 53 and 54 will produce a positive logic signal which, by virtue of the OR gate 57, provides a high signal at the terminal 52 to close the gate 50. In this event the terminals 49 and 51 are effectively connected together resulting in the signal at the terminal 51 being equal to the sample and held composite digital delta signal at 49 which is related to the difference between the previous and present composite analog engine load signal at the terminal 34. It should be noted that the flowchart 100, even though it represents the preferred operation of the microprocessor 11, also generally describes the operation of the equivalent hardware embodiment shown in FIG. 3.

The present invention has provided a load transient compensation apparatus which minimizes the number of inputs to a microprocessor control circuit while effectively predicting the amount of load to be provided in accordance with the closure of a plurality of switches. Thus the number of inputs required for the microprocessor is reduced and the operation of the microprocessor is greatly simplified while only a minimum amount of external circuitry is required by the present load transient compensation system. Preferably the present invention is utilized for engine load transient compensation by predicting when additional engine loads will be implemented in accordance with accessory switch closures, and then implementing engine load transient compensation during an idle speed control mode of an engine control system. However the underlying principles appear to be applicable to any apparatus in which it is desired to predict an amount of load applied to the apparatus and rapidly implement control of the apparatus so as to compensate for this change in load without waiting for this load change to manifest itself by providing corresponding variations in the normal apparatus sensors corresponding to the sensors 12 through 14 in the present embodiment. While specific embodiments of the present invention have been shown and described, further modifications and improvements will occur to those skilled in the art. All such modifications which retain the basic underlying principles disclosed and claimed herein are within the scope of this invention.

What is claimed:

1. An engine load transient compensation system comprising:

a plurality of switch means each of which, in response to actuation thereof, provides an associated digital switch signal which in turn implements providing an associated output load to an engine receiving a predetermined fuel mixture;

circuitry means coupled to said plurality of switch means for receiving said digital switch signals and developing, in response thereto, a composite signal having a signal characteristic related to the total amount of engine load to be provided in accordance with all of said digital switch signals;

transient detection means separate from and coupled to said circuitry means for receiving said composite signal as an input and determining a predetermined change in said signal characteristic over a time interval by monitoring said composite signal, rather than by separately monitoring each of said digital switch signals and for providing, in response thereto, a control signal;

control means coupled to said transient detection means for receiving said control signal and implementing control of said engine in response to said control signal, wherein said circuitry means receives said digital switch signals and provides in response thereto an analog signal as said composite signal with the magnitude of said analog signal corresponding to said signal characteristic, and said analog signal magnitude being related to the total amount of engine load provided in accordance with actuation of all of said switch means.

2. An engine load transient compensation system according to claim 1 wherein said transient detection means comprises a microprocessor means for receiving said analog signal, effectively sampling the magnitude of said analog signal, determining when said signal magnitude exceeds a predetermined magnitude change over an interval of time and providing, in response thereto, said control signal.

3. An engine load transient compensation system according to claim 2 wherein said microprocessor means includes means for providing said control signal with an effective magnitude which varies in accordance with the degree of change in the magnitude of said composite signal.

4. An engine load transient compensation system according to claim 3 wherein the degree of change in said effective magnitude of said control signal is proportional to the degree of change of said composite signal.

5. An engine load transient compensation system according to claim 2 wherein said control means includes means responsive to said control signal for controlling the fuel mixture supplied to said engine.

6. An engine load transient compensation system according to claim 1 wherein said circuitry means comprises a plurality of predetermined resistors each associated with one of said switch means and series coupled between said associated switch means and a summing terminal at which said composite signal is provided, said summing terminal provided as an input to said transient detector means.

7. An engine load transient compensation system according to claim 6 wherein each of said resistors has a magnitude related to the degree of engine load implemented in response to activation of the switch means associated with each of said resistors, respectively.

8. An engine load transient compensation system according to claim 7 wherein the ratio of the magnitudes of each of said resistors to one another is approximately inversely proportional to the ratio of the magnitudes of the engine loads implemented in response to activation of the switch means associated with each of said resistors, respectively.

9. An engine load transient compensation system according to claim 8 wherein said summing terminal is coupled as an input to a microprocessor means.

10. An engine load transient compensation system according to claim 9 wherein said microprocessor means includes means for effectively sampling the magnitude of said analog signal, determining when said signal exceeds a predetermined magnitude change over an interval of time and providing, in response thereto, said control signal.

11. An engine load transient compensation system according to claim 10 wherein said microprocessor means includes means for determining said time interval.

12. An engine load transient compensation system according to claim 6 wherein said summing ternimal is coupled as an input to a microprocessor means.

13. An engine load transient compensation system according to claim 12 wherein said microprocessor means includes means for effectively sampling the magnitude of said analog signal, determining when said signal exceeds a predetermined magnitude change over an interval of time and providing, in response thereto, said control signal.

14. An engine load transient compensation system according to claim 13 wherein said microprocessor means includes means for determining said time interval.

15. A load transient compensation system comprising:

a plurality of switch means each of which, in response to actuation thereof, provides an associated digital switch signal which in turn implements providing an associated output load to an apparatus controlled in accordance with at least one received control input;

circuitry means coupled to said plurality of switch means for receiving said digital switch signals and developing, in response thereto, a composite signal having a signal characteristic related to the total amount of load to be provided in accordance with all of said digital switch signals;

transient detection means separate from and coupled to said circuitry means for receiving said composite signal as an input and determining a predetermined change in said signal characteristic over a time interval by monitoring said composite signal, rather than by separately monitoring each of said digital switch signals, and for providing, in response thereto, a control signal;

control means coupled to said transient detection means for receiving said control signal and implementing control of said apparatus in response to said control signal, wherein said circuitry means receives said digital switch signals and provides in response thereto an analog signal as said composite signal with the magnitude of said analog signal corresponding to said signal characteristic, and said analog signal magnitude being related to the total amount of load provided in accordance with actuation of all of said switch means.

16. A load transient compensation system according to claim 15 wherein said transient detection means comprises a microprocessor means for receiving said analog signal, effectively sampling the magnitude of said analog signal, determining when said signal magnitude exceeds a predetermined magnitude change over an interval of time and providing, in response thereto, said control signal.

17. A load transient compensation system according to claim 16 wherein said microprocessor means includes means for providing said control signal with an effective magnitude which varies in accordance with the degree of change in the magnitude of said composite signal.

18. A load transient compensation system according to claim 17 wherein the degree of change in said effective magnitude of said control signal is proportional to the degree of change of said composite signal.

19. A load transient compensation system according to claim 16 wherein said control means includes means responsive to said control signal for controlling said control input supplied to said engine.

20. A load transient compensation system according to claim 15 wherein said circuitry means comprises a plurality of predetermined resistors each associated with one of said switch means and series coupled between said associated switch means and a summing terminal at which said composite signal is provided, said summing terminal provided as an input to said transient detector means.

21. A load transient compensation system according to claim 20 wherein each of said resistors has a magnitude related to the degree of load implemented in response to activation of the switch means associated with each of said resistors, respectively.

22. A load transient compensation system according to claim 21 wherein the ratio of the magnitudes of each of said resistors to one another is approximately inversely proportional to the ratio of the magnitudes of the loads implemented in response to activation of the switch means associated with each of said resistors, respectively.

23. A load transient compensation system according to claim 22 wherein said summing terminal is coupled as an input to a microprocessor means.

24. A load transient compensation system according to claim 23 wherein said microprocessor means includes means for effectively sampling the magnitude of said analog signal, determining when said signal exceeds a predetermined magnitude change over an interval of time and providing, in response thereto, said control signal.

25. A load transient compensation system according to claim 24 wherein said microprocessor means includes means for determining said time interval.

26. A load transient compensation system according to claim 20 wherein said summing terminal is coupled aa an input to a microprocessor means.

27. A load transient compensation system according to claim 26 wherein said microprocessor means includes means for effectively sampling the magnitude of said analog signal, determining when said signal exceeds a predetermined magnitude change over an interval of time and providing, in response thereto, said control signal.

28. A load transient compensation system according to claim 27 wherein said microprocessor means includes means for determining said time interval.

* * * * *